United States Patent [19]
Nakai et al.

[11] 4,338,286
[45] Jul. 6, 1982

[54] PROCESS FOR RECOVERING URANIUM AND/OR THORIUM FROM A LIQUID CONTAINING URANIUM AND/OR THORIUM

[75] Inventors: Eiichiro Nakai, Urawa; Hiroshi Kojima, Hasuda; Shoichi Tanaka, Musashino; Toshiyuki Kai; Shinichi Hasegawa, both of Tohkaimura, all of Japan

[73] Assignee: Mitsubishi Kinzoku Kabushiki Kaisha, Tokyo, Japan

[21] Appl. No.: 143,116

[22] Filed: Apr. 23, 1980

[30] Foreign Application Priority Data

Feb. 1, 1980 [JP] Japan .................................. 55-11191

[51] Int. Cl.³ ...................... C01G 56/00; C01F 15/00
[52] U.S. Cl. ........................................ 423/12; 423/11; 423/15; 423/16; 252/627
[58] Field of Search .................... 252/301.1 W; 423/6, 423/11, 12, 15, 16, 252, 253

[56] References Cited

U.S. PATENT DOCUMENTS

| | | | |
|---|---|---|---|
| 2,839,358 | 6/1958 | Price | 423/16 |
| 2,878,100 | 3/1959 | Googin | 423/16 |
| 3,238,014 | 3/1966 | Gens | 423/16 |

FOREIGN PATENT DOCUMENTS

| | | |
|---|---|---|
| 2308690 | of 1976 | France |
| 47-35199 | 9/1972 | Japan |
| 48-38320 | 11/1973 | Japan |
| 53-27800 | 3/1978 | Japan |

*Primary Examiner*—Edward A. Miller
*Assistant Examiner*—J. J. Zimmerman
*Attorney, Agent, or Firm*—Edward J. Brenner

[57] ABSTRACT

A process for recovering uranium and/or thorium from a liquid containing uranium and/or thorium is disclosed, which comprises making a precipitate composed mainly of amorphous silica formed by adding water glass to the liquid containing uranium and/or thorium, capturing the uranium and/or thorium in the liquid by the precipitate, treating the precipitate with acid to elute the captured uranium and/or thorium, adding ammonia or hydrogen peroxide to an acidic solution containing the eluted uranium and/or thorium to form a precipitate composed of ammonium salt or peroxide of the uranium and/or thorium, and filtering out the ammonium salt or peroxide precipitate. Thus, high purity solid uranium and/or thorium reutilizable for manufacture of nuclear fuel material can be recovered in high yield.

2 Claims, No Drawings

PROCESS FOR RECOVERING URANIUM AND/OR THORIUM FROM A LIQUID CONTAINING URANIUM AND/OR THORIUM

BACKGROUND OF THE INVENTION

The present invention relates to a process for recovering uranium and/or thorium from a liquid containing uranium and/or thorium which can recover in high yield high purity uranium and/or thorium reutilizable for manufacture of nuclear fuel material.

As a process for recovering uranium and/or thorium contained in liquid wastes discharged from nuclear fuel material handling facilities of nuclear fuel manufacturing factories, the applicant has disclosed water glass precipitation processes in Japanese Patent Publication No. 38,320 of 1973 and Japanese Patent Laid Open Application No. 27,800 of 1978.

In these water glass precipitation processes, the added water glass (sodium silicate) becomes amorphous silica, a powerful adsorbent having a large surface area and a high activity in the solution in which fluorine and ammonia, or nitric acid radical and ammonia, or chlorine and ammonia coexist, forming a precipitate composed mainly of the amorphous silica and having an excellent filterability (hereinafter referred to as an amorphous silica precipitate). At that time, the thus formed amorphous silica precipitate captures by adsorption the uranium and/or thorium contained in the solution, thereby making the uranium and/or thorium removed therefrom. Further, as the uranium and/or thorium captured by the amorphous silica precipitate can be eluted by acid treatment, the uranium and/or thorium can be recovered as an acidic solution by filtering out the amorphous silica precipitate. However, reutilizing the thus recovered uranium and/or thorium directly as nuclear fuel material is difficult because of existence or impurities entered thereinto in the treatment process. Namely, industrial water glass sometimes contains considerable amounts of impurities as Al, Ca, Fe, Mg and the like. In the acid treatment of the amorphous silica precipitate, these impurities are not only eluted together with the uranium and/or thorium to pass into the acidic solution, but also Si, a main component of the precipitate, is partly eluted into the acidic solution. Therefore, in order to reutilize the thus eluted uranium and/or thorium for manufacture of nuclear fuel material, these impurities must be removed to a level which satisfies specifications for impurity required for a nuclear fuel.

As a process for removing impurities of nuclear fuel material, a solvent extraction process or an ion exchange process is adopted widely. These processes, however, decrease the impurity removing ability when Si exists in the nuclear fuel material. Therefore, it is desirable to depress an amount of Si existing in the nuclear fuel material as low as possible.

On the other hand, recently from the viewpoints of enlargement of the treating capacity, improvement of the total yield and decrease of scrap and wastes in nuclear fuel manufacturing factories, reutilization of the nuclear fuel material recovered by the above-mentioned water glass precipitation processes has been strongly demanded.

The present invention is an improved invention of the above-mentioned water glass precipitation processes devised to meet this demand.

BRIEF SUMMARY OF THE INVENTION

The object of the present invention is to provide a process for recovering uranium and/or thorium from a liquid containing uranium and/or thorium which can recover in high yield high purity uranium and/or thorium reutilizable for manufacture of nuclear fuel material from a liquid containing uranium and/or thorium.

According to the present invention, there is provided a process for recovering uranium and/or thorium from a liquid containing uranium and/or thorium comprising adding water glass to a liquid containing uranium and/or thorium in the presence of fluorine and ammonia, or nitric acid radical and ammonia, or chlorine and ammonia to make a precipitate composed mainly of amorphous silica formed and to make said uranium and/or thorium in said liquid captured by said formed precipitate, treating said precipitate capturing said uranium and/or thorium with acid to make said captured uranium and/or thorium eluted, adding ammonia to an acidic solution containing said eluted uranium and/or thorium obtained by filtering out said precipitate to make a precipitate composed of ammonium salt of said uranium and/or thorium formed, and filtering out said ammonium salt precipitate.

Further, the present invention can also add hydrogen peroxide, instead of the above-mentioned ammonia, to the acidic solution containing the eluted uranium and/or thorium obtained by filtering out the amorphous silica precipitate to make a peroxide precipitate of uranium and/or thorium formed and filter out it.

DETAILED DESCRIPTION OF INVENTION

The operation conditions in the acid elution and the ammonia precipitation or the hydrogen peroxide precipitation mentioned above are as follows;

(1) In the elution of the uranium and/or thorium captured by the amorphous silica precipitate with nitric acid, a large portion of the uranium and/or thorium can be eluted at pH under 3.5 at elution, while the lower the pH is, the more Si of the amorphous silica precipitate is eluted. Therefore, the pH at elution is desirable to be kept at about 2.5 to depress elution of Si under maintenance of a high elution rate of the uranium and/or thorium. Further, it is preferable to carry out a stirring operation to promote the acid elution.

(2) When the acidic solution containing the eluted uranium and/or thorium, namely, an eluant, is added with ammonia to form an ammonium salt precipitate, a large portion of the uranium and/or thorium can be recovered as the precipitate by adjusting the pH at precipitation aging to above 9. In this case, as a part of the eluted Si in the eluant becomes again an amorphous silica, the filterability of the precipitate obtained is excellent. Further, it is preferable to carry out a stirring operation to promote the ammonia precipitation.

(3) When the eluant is added with hydrogen peroxide to make a peroxide precipitate formed, it is preferable to adjust the pH of the eluant to the range of 1~4, especially to about 2. In this case, simultaneously with formation of the peroxide precipitate, nitric acid is formed to lower the pH. Therefore, it is desirable to adjust the pH to the range of 2~6 with alkali such as ammonia and the like at precipitation aging in order to prevent impurities entering into the peroxide precipitate and to improve a filterability and a recovery rate thereof.

(4) In the hydrogen peroxide precipitation, when the concentration of the uranium and/or thorium of the eluant is high, the filterability of the formed precipitate is bad and a loss due to solubility in the filtrate is larger. Therefore, the concentration of the uranium and/or thorium of the eluant is preferable to be under 100 g/l, especially in the range of 10~60 g/l.

(5) The amount of hydrogen peroxide to be added is preferable to be more than 1.2 equivalent. Under 1.2 equivalent, it is difficult to form a necessary amount of peroxide precipitate.

(6) In the hydrogen peroxide precipitation, it is preferable to carry out a stirring operation at ordinary temperature ~60° C.

The thus filtered out ammonium salt- and peroxide precipitates of uranium and/or thorium are respectively washed and dried. These precipitates are obtained in high yield and are directly reutilizable for manufacture of nuclear fuel owing to their high purity. On the other hand, as the filtrates obtained by filtering out the above-mentioned precipitates contain no longer uranium and-/or thorium, they can be freely discharged.

As described above, according to the present invention, uranium and/or thorium captured by the amorphous silica precipitate formed by applying the water glass precipitation process to a liquid containing uranium and/or thorium can be recovered in high yield as high purity solid uranium and/or thorium reutilizable for manufacture of nuclear fuel by simple operations which do not necessitate any conventional process such as the solvent extraction process, therefore the present invention is very useful in manufacturing nuclear fuel.

The present invention will be understood more readily with reference to the following examples. The examples, however, are intended to illustrate the present invention and are not be construed to limit the scope of the present invention.

EXAMPLE 1

A liquid containing uranium is added with water glass in the presence of fluorine and ammonia to make an amorphous silica precipitate formed. The filtered out amorphous silica precipitate is added with the approximately same weight of water followed by addition of nitric acid under stirring. After pH at elution is respectively adjusted to 1, 2, 2.5, 3, 3.5, 4, and 6 with addition of nitric acid, stirring is carried out for 30 minutes. A nitric acid solution containing uranyl nitrate obtained by filtering out the precipitate is added with aqueous ammonia under stirring to adjust pH to 9 and further aged for 30 minutes. After the thus formed ammonium salt precipitate is filtered out, washed and dried, the uranium content and Si content of the dried precipitate are measured. The result of the measurement is shown in Table 1. Table 1 shows that when pH at elution is under 3.5, uranium recovery (%) is high, while the lower pH is, the higher Si content (%) is

TABLE 1

| NO. | pH at elution | uranium recovery (%) | Si content (%) |
|---|---|---|---|
| 1 | 1 | 99 | 5.4 |
| 2 | 2 | 99 | 4.3 |
| 3 | 2.5 | 99.5 | 2.3 |
| 4 | 3 | 98 | — |
| 5 | 3.5 | 96 | 2.2 |
| 6 | 4 | 59 | 2.1 |
| 7 | 6 | 57 | — |

EXAMPLE 2

A liquid containing uranium is added with water glass in the presence of fluorine and ammonia to make an amorphous silica precipitate formed. After the formed amorphous silica precipitate containing 2% of uranium is at pH 2 treated with nitric acid to make the uranium eluted, the amorphous silica precipitate is filtered out to provide a nitric acid solution. The uranium concentration of the thus obtained nitric acid solution is 10 g/l. Each 700 ml of this nitric acid solution as a starting liquid is withdrawn as a sample. After pH of the four samples is respectively adjusted to 1, 2, 3, 4, the samples are respectively added with 8 equivalent (15 equivalent only at pH 1) of hydrogen peroxide at ordinary temperature under stirring and further aged for 10 minutes. Then, the formed yellow precipitate (uranium peroxide) is filtered out, washed and dried. The impurity content of the dried precipitate is measured. The result of the measurement is shown in Table 2. Table 2 shows that the purity of recovered uranium peroxide is extremely high and uranium recovery is approximately 100%.

TABLE 2

| | $H_2O_2$ precipitation operation condition | | |
|---|---|---|---|
| | U concentration (g/l) | added $H_2O_2$ (equivalent) | pH |
| starting liquid | 10 | — | 2 |
| 1 | 10 | 15 | 1 |
| 2 | 10 | 8 | 2 |
| 3 | 10 | 8 | 3 |
| 4 | 10 | 8 | 4 |

| | impurity content (ppm) | | | | | | |
|---|---|---|---|---|---|---|---|
| | Al | Ca | Fe | Mg | Si | Ti | Zn |
| starting liquid | 31,000 | 1,000 | 5,800 | 1,000 | 76,000 | 210 | 180 |
| 1 | 60 | <5 | 40 | 4 | <10 | 12 | <10 |
| 2 | 280 | 19 | 48 | 12 | <10 | 14 | <10 |
| 3 | 310 | <5 | 39 | 4 | <10 | <4 | <10 |
| 4 | 350 | 28 | 80 | 11 | <10 | 12 | <10 |

EXAMPLE 3

A liquid containing uranium is added with water glass in the presence of nitric acid radical and ammonia to make an amorphous silica precipitate formed. The amorphous silica precipitate capturing the uranium is treated in a similar manner as Example 2 and then there is obtained a nitric acid solution (uranium concentration 50 g/l, pH 2) containing the uranium eluted from the amorphous silica precipitate. This nitric acid solution kept at 55° C. is added with 1.5 equivalent of 30% hydrogen peroxide under stirring and the pH at precipitation aging is adjusted to 4 with 28% aqueous ammonia. The thus formed uranium peroxide precipitate is excellent in filterability. It is filtered out, washed and dried. The impurity content of the dried precipitate is measured. The result of the measurement is as in the following. The uranium recovery is approximately 100%.

| (unit: ppm) | | | | | |
|---|---|---|---|---|---|
| Al | Ca | Fe | Mg | Si | Zn |
| <25 | 25 | 40 | 3 | 10 | <10 |

EXAMPLE 4

A liquid containing thorium is added with water glass in the presence of nitric acid radical and ammonia to make an amorphous silica precipitate formed. The amorphous silica precipitate capturing the thorium is treated in a similar manner as Example 2 and then there is obtained a nitric acid solution (thorium concentration 40 g/l, pH 2) containing the thorium eluted from the amorphous silica precipitate. By treating this nitric acid solution kept at 55° C. in a similar manner as Example 3, the eluted thorium is recovered as thorium peroxide in an approximately 100% yield. The impurity content of the recovered product is as in the following.

| (unit: ppm) | | | | | |
|---|---|---|---|---|---|
| Al | Ca | Fe | Mg | Si | Zn |
| <25 | 25 | 50 | <2 | 20 | <10 |

EXAMPLE 5

A liquid containing uranium and thorium in equal concentration is added with water glass in the presence of nitric acid radical and ammonia to make an amorphous silica precipitate formed. The amorphous silica precipitate capturing the uranium and thorium is treated in a similar manner as Example 2, and there is then obtained a nitric acid solution (uranium concentration 15 g/l, thorium concentration 15 g/l, pH 2) containing the uranium and thorium respectively eluted from the amorphous silica precipitate. By treating this nitric acid solution kept at 55° C. in a similar manner as Example 3, the eluted uranium and thorium are recovered as uranium peroxide and thorium peroxide in approximately 100% yields. The impurity content of the recovered product is as in the following.

| (unit: ppm) | | | | | |
|---|---|---|---|---|---|
| Al | Ca | Fe | Mg | Si | Zn |
| <25 | 10 | 55 | <2 | <10 | <10 |

What is claimed is:

1. A process for recovering a metal selected from the group consisting of uranium, thorium and mixtures thereof, from a liquid containing said metal comprising the steps of adding water glass to said liquid in the presence of ammonia water and an aqueous material selected from the group consisting of fluorine, nitric acid radical and chlorine to cause a precipitate composed mainly of amorphous silica to be formed, whereby said metal is absorbed, filtering said precipitate therefrom, treating said filtered precipitate with acid to cause said absorbed metal to be eluted therefrom, filtering said precipitate to recover said eluted metal as an acidic filtrate therefrom, adding ammonia water to an acidic solution of said filtrate containing said eluted metal to cause a precipitate composed of ammonium salt of said metal to be formed, and filtering said ammonium salt precipitate therefrom.

2. A process for recovering a metal selected from the group consisting of uranium, thorium and mixtures thereof, from a liquid containing said metal comprising the steps of adding water glass to said liquid in the presence of ammonia water and an aqueous material selected from the group consisting of fluorine, nitric acid radical and chlorine to cause a precipitate composed mainly of amorphous silica to be formed, whereby said metal is absorbed, filtering said precipitate therefrom, treating said filtered precipitate with acid to cause said absorbed metal to be eluted therefrom, filtering said precipitate to recover said eluted metal as an acidic filtrate therefrom, adding hydrogen peroxide to an acidic solution of said filtrate containing said eluted metal to cause a precipitate composed of peroxide of said metal to be formed, and filtering said peroxide precipitate therefrom.

* * * * *